Figure 1:
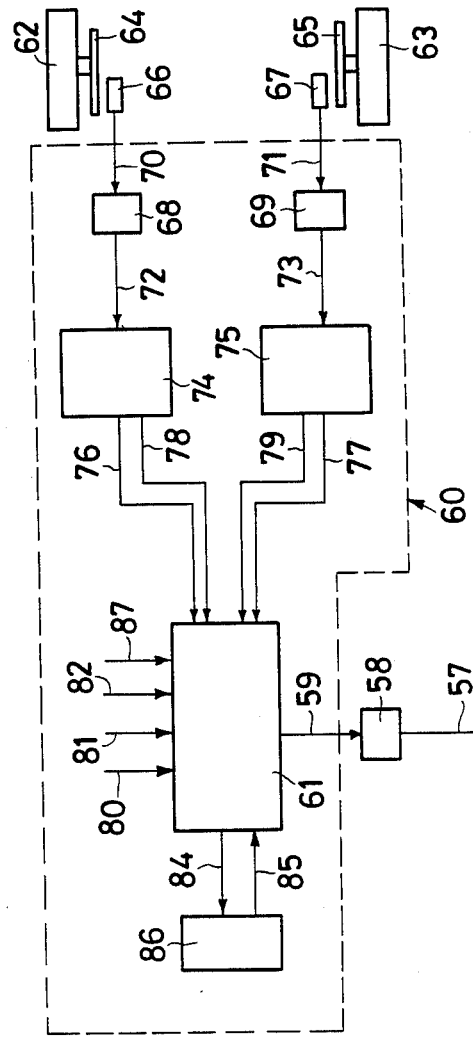
Figure 1:
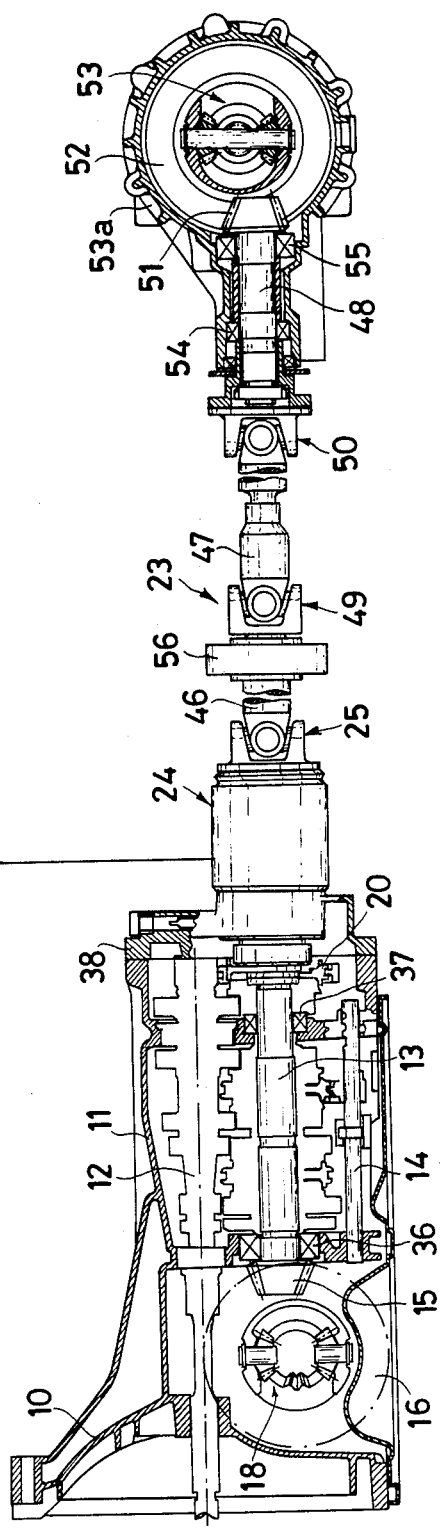

United States Patent [19]

Fanti et al.

[11] Patent Number: 4,714,127
[45] Date of Patent: Dec. 22, 1987

[54] CONTROL APPARATUS FOR A VEHICLE WITH DISENGAGEABLE FOUR-WHEEL DRIVE

[75] Inventors: Cristoforo Fanti, Milan; Gianclaudio Travaglio, Arese; Luciano Ferrario, Rho; Saverio Moscatelli, Milan, all of Italy

[73] Assignee: Alfa Romeo Auto S.p.A., Naples, Italy

[21] Appl. No.: 892,361

[22] Filed: Aug. 4, 1986

[30] Foreign Application Priority Data

Aug. 6, 1985 [IT] Italy .............................. 21871 A/85

[51] Int. Cl.$^4$ ...................... B60K 23/08; B60K 17/34
[52] U.S. Cl. .................................. 180/233; 364/424.1
[58] Field of Search ............... 180/247, 233, 248, 249, 180/250; 364/424.1

[56] References Cited

U.S. PATENT DOCUMENTS 4,417,641 11/1983 Kageyama ........................... 180/247
4,617,840 10/1986 Yamakawa ........................... 180/247

FOREIGN PATENT DOCUMENTS 0049961 9/1981 European Pat. Off. ................... 233/
2088975 6/1982 United Kingdom ...................... 247/
2132303 7/1984 United Kingdom ................. 180/233

Primary Examiner—John A. Pekar
Attorney, Agent, or Firm—Charles E. Brown; Charles A. Brown

[57] ABSTRACT

A control device for a vehicle with a disengageable four-wheel drive which has two differentials. The control device has a number of sensor means and a comparator means by which the speed of the vehicle; position of the accelerator and brake pedals; and a predetermined value are compared. In response to the comparison, the control device selectively and automatically engages and disengages the vehicle's four-wheel drive mode.

4 Claims, 2 Drawing Figures

U.S. Patent   Dec. 22, 1987   Sheet 1 of 2   4,714,127

CONTROL APPARATUS FOR A VEHICLE WITH DISENGAGEABLE FOUR-WHEEL DRIVE

This invention relates to a control apparatus for a vehicle with a disengageable four-wheel drive comprising two differentials, and in particular a control apparatus for the automatic engagement and disengagement of the four-wheel drive as an alternative to single-axle (two-wheel) drive, according to the vehicle running conditions. Under numerous running conditions, four-wheel drive vehicles are known to perform better than two-wheel drive vehicles, for equal static and dynamic load distribution.

For example, during acceleration while travelling in a straight line or while turning, both on dry ground and, particularly, on wet or snow-covered ground, four-wheel drive vehicles are able to transmit greater power because they can utilise all the available road adhesion, by being able to distribute traction to all four wheels. Thus for equal lateral acceleration, four-wheel drive vehicles allow much higher longitudinal acceleration than two-wheel drive vehicles, for any type of road surface.

In particular, four-wheel drive vehicles with two differentials give the best absolute performance in straight-line driving, not only during acceleration but also during braking, becuas the distribution of traction and braking forces can adapt to the static and dynamic load distribution on the front and rear wheel groups, and thus allow optimum utilisation of the available road adhesion. In contrast, in four-wheel drive vehicles with three differentials, the traction and braking distribution is fixed beforehand at the design stage, and cannot follow the dynamic load variations. Consequently, locking of the third differential is used.

It is during sudden braking and partly during acceleration that vehicles with two differentials can be penalised because of the fact that the front and rear wheel groups are rigidly connected together and the third differential, which serves for eliminating kinematic incompatibilities, is missing. Under these conditions, the two wheel groups can slip or simultaneously lock.

In turning at low speed, vehicles with two differentials can present difficulties, because the wheels of the front and rear wheel groups travel through trajectories of different radii of curvature, and therefore have different speeds. In particular, the rear wheels, which travel through trajectories of smaller radii of curvature, have a higher speed than the front wheels, which follow trajectories of a greater radius. The result is an effect of one wheel group dragging the other because of the rigid connection.

The greatest problems are encountered during acceleration through very sharp bends, and particularly when starting with a wide steering angle on a road surface with a high coefficient of adhesion, where the effects of locking between the front and rear wheel groups can lead to sudden stoppage of the vehicle.

In four-wheel drive vehicles with two differentials, the output shaft of the change-speed gearbox is operationally connected to the two differentials of the front and rear wheel groups, and where the four-wheel drive can be disengaged in order to pass to two-wheel drive, a separable connection is interposed between the output shaft of the gearbox and one of the differentials, and is either manually operated or automatically operated in dependency on certain vehicle operating parameters, such as that described in U.S. Pat. No. 4,417,641.

These known constructions are however either inadequate such as those operated manually, or only partly satifactory such as the aforesaid automatically operated one, the action of which is limited to only some of the critical operating conditions.

The object of the present invention is a control apparatus which obviates the limitations of known constructions, and which is capable of operating with maximum efficiency and reliability under all those conditions in which passage from four-wheel drive to two-wheel drive and vice versa is required or is in any event advisable.

The control apparatus according to the invention is particularly suitable for a four-wheel drive vehicle in which one wheel group is always engaged, the output shaft of the change-speed gearbox being connected permanently to the differential of said wheel group and being connected selectively to the differential of the other wheel group by separable connection means and relative actuator means, said control apparatus comprising means which sense the respective speed of the wheels of the always engaged group and are operationally connected to a control unit comprising comparator means arranged to compare the wheel speed signals with predetermined limiting values to establish whether they are greater or less than said limiting values and to provide signals indicative of the results of the comparison, said control unit being operationally connected to said actuator means, the apparatus being characterised by also comprising means for sensing the position of the brake pedal and means for sensing the commencement of travel of the accelerator pedal and also operationally connected to said control unit, said control unit comprising logical operation means able to feed to said actuator means first signals for causing said connection means to disconnect the differential of said other wheel group from the output shaft of the gearbox should the speed be less than the predetermined limit, and scond signals for causing said connection means to make said differential rigid with the output shaft of the gearbox should the speed exceed the predetermined limit, said unit further comprising processor means arranged to obtain from the signals of said wheel speed sensors signals indicative of the speed variations and the direction of said variations in order to distinguish acceleration from deceleration, said comparator means being also able, in the presence of the signal indicating that the travel of the accelerator pedal has commenced, to compare the acceleration signals with a predetermined limiting value to establish whether these are greater or less than said limiting value, and to provide signals indicative of the results of the comparison, said logical operation means being also able to exclude said first signals and to feed to said actuator means said second control signals for operating said connection means and making said differential rigid with the output shaft of the gearbox should the acceleration exceed the predetermined limit, said comparator means being further able, in the presence of the signal indicating operation of the brake pedal, to compare the deceleration signals with a predetermined limiting value to establish whether they are greater or less than said limiting value and to provide signals indicative of the results of the comparison, said logical operation means being able to exclude said second signals and being able to feed said first signals to said actuator means in order to cause said connection means to disconnect the differential of said other wheel group from the output shaft of the gearbox, even at a speed exceeding said limiting value, should the deceleration be greater than the respective limiting value. By this means the apparatus enables the four-wheel drive to be disengaged when the vehicle runs at low speed, so that the transmission does not become locked in the case of sharp turning, as the drive is only by means of the wheels of one axle.

However should the wheels slip because of excessive acceleration, especially on starting the vehicle on poorly adhering ground, four-wheel drive is restored in order to best utilise the available adhesion, even if the vehicle speed is less than the predetermined limit for the engagement of the four-wheel drive.

Moreover, in the case of wheel slippage due to excessive deceleration brought on by too heavy braking, especially on poorly adhering ground, the apparatus disengages the four-wheel drive to pass to two-wheel drive, so as to prevent locking of the four wheels and to allow the rear wheel group to recover its adhesion, even if the vehicle speed at the commencement of braking exceeds the limit for engagement of four-wheel drive.

Characteristics and advantages of the invention are illustrated hereinafter with reference to the accompanying FIGS. 1 and 2, which show a preferred embodiment of said invention by way of non-limiting example.

Figure 2:
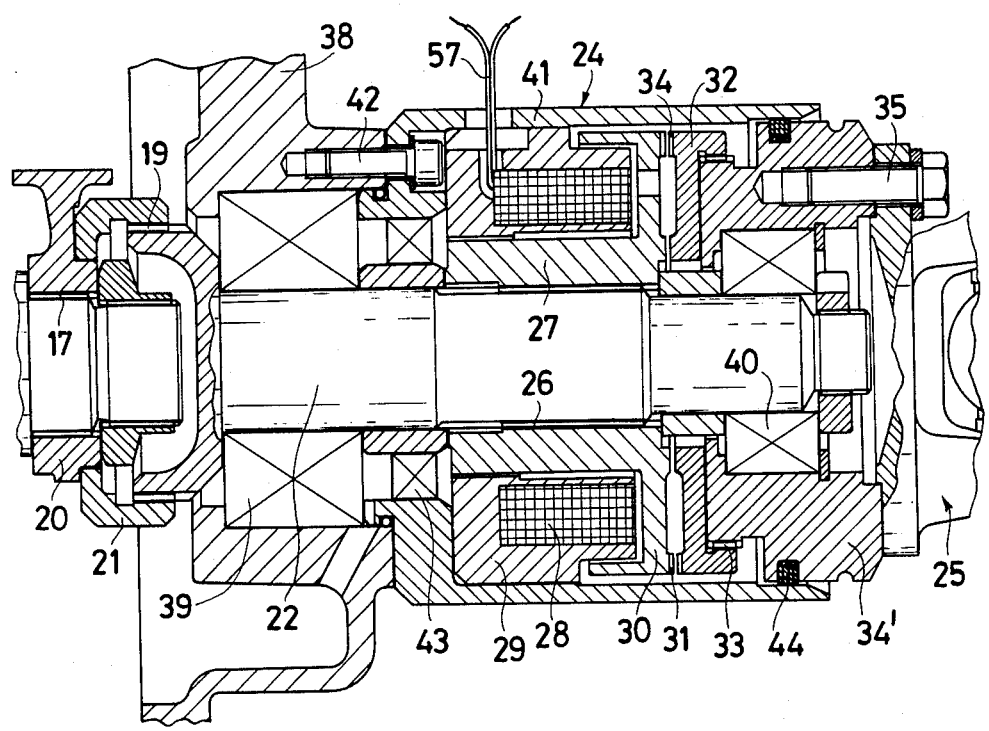

In FIG. 1, the transmission is shown partly in section and the control apparatus is illustrated by a block diagram;

FIG. 2 is an enlarged view of a detail of FIG. 1.

In FIG. 1, the reference numeral 10 indicates the bellhousing of the friction clutch, not shown, and 11 the gearbox casing. The main shaft, indicated by 12, and transmission shaft, indicated by 13, are visible. Also shown is one of the rods 14 which are operated by the gear lever for engaging the various transmission ratios. The bevel pinion 15 is rigid with the shaft 13 and engages the ring gear 16 of a differential indicated overall by 18. In this specific case, the differential 18 transmits motion to the wheels of the front axle, and they are therefore always engaged.

The shaft 13 is connected by the keys 17 and 19 to the hub 20, ring nut 21 and shaft 22, this latter being connected to the drive shaft 23 by an electromagnet clutch, indicated overall by 24 and shown in detail in FIG. 2, and a universal joint 25. The shaft 22 is connected by the key 26 to the core 27 of a coil 28, its holder being indicated by 29. A pulley 30 provided with peripheral ring of frontal teeth 31 is rigid with the core 27, and in front of the pulley 30 there is disposed a disc 32 which forms the armature of the coil 28, and is also provided with a peripheral ring of frontal teeth 34.

The disc 32 is axially mobile, being connected by the key 33 to the flange 34', this latter being fixed by the screw 35 to a spider of the universal joint 25.

The figures also show the bearings 36 and 37 of the shaft 13, the cover 38 of the gearbox casing 11, the bearings 39 and 40 of the shaft 22, the casing 41 of the electromagnetic clutch 24 fixed to the cover 38 by the screws 42, and the seal rings 43 and 44.

In FIG. 1, the reference numeral 46 indicates the first portion, 47 the second portion and 48 the third portion of the drive shaft 23. The reference numeral 56 indicates the intermediate support for said shaft and 49 and 50 indicate the universal joints which connect together the three shaft portions.

The end portion 48 of the drive shaft is rigid with the pinion 51, which engages the ring gear 52 of the differential, indicated overall by 53 and connected to the wheels of the rear axle.

The figure also shows the bearings 54 an 55 of the third portion 48 of the shaft 23, and the rear axle casing 53a.

The coil 28 of the electromagnetic clutch 24 is connected by the lead 57 to the power stage 58 of the control device, indicated overall by 60.

The power stage 58 is connected by the line 59 to the output unit of the microcomputer indicated by 61. FIG. 1 shows diagrammatically the vehicle front wheels 62 and 63, with which respective tachometer wheels 64 and 65 provided with peripheral notches are rigid. The reference numerals 66 and 67 indicate sensors operationally associated with the wheels 64 and 65, and 68 and 69 indicate the squaring and amplifying stages for the pulse signals arriving from the sensors 66 and 67 through the lines 70 and 71.

The output signals from the squaring stages 68, 69 are fed through the lines 72 and 73 to the phase locked loop (PLL) comparator stages 74 and 75.

The comparator stages (PLL) 74 and 75 are able to supply, through the lines 76, 77, 78, 79, a signal proportional to the speed of the wheels 62 and 63, and window signals proportional to the variations in speed, acceleration and deceleration.

The microcomputer 61 also receives the signals 80, 81, 82, provided by switches, not shown, connected respectively to the brake pedal, clutch pedal and gear engagement rod of the gearbox, and a signal 87 originating from a sensor which senses the commencement of travel of the accelerator pedal. A counter 86 is also connected to the microcomputer 61 by the lines 84 and 85.

During the operation of the device, the signals originating from the lines 76, 77, 78, 79 are processed by the microcomputer 61 with the aid of the counter 86, to determine the speed, acceleration and deceleration signals of the vehicle wheels.

The microcomputer 61 is programmed to execute the operational sequences scheduled for controlling the engagement and disengagement of the electromagnetic clutch 24.

The microcomputer 61 thus processes not only the speed signals for the wheels (76 and 78), but also the signals relating to the variation in speed, acceleration or deceleration (77 and 79), should the vehicle be accelerating or decelerating.

The microcomputer 61 compares these signals with predetermined limiting speed and acceleration or deceleration values, and emits signals indicative of the results of the comparison.

The microcomputer 61 compares the speed variation signals with the limiting deceleration values, if simultaneously it receives the signal 80 from the brake pedal, and compares the same signals with the limiting acceleration value if simultaneously it receives the signal 87 indicating commencement of the accelerator pedal travel.

The microcomputer 61 compares the speed signal with a first limiting value if the vehicle speed is increasing, and with a second slightly lower limiting value if the vehicle speed is decreasing, and emits signals indicative of the results of the comparison.

The microcomputer 61 also determines from the signals 81 and 82, originating from the clutch pedal and from the gear control rod of the gearbox, whether the friction clutch is engaged or not and whether the gearbox is in neutral or not, to prevent the four-wheel drive being engaged and disengaged while the vehicle is at rest, due to operation of the accelerator pedal.

If the clutch is disengaged and the gearbox is not in neutral, and it is determined that the vehicle speed is less than the limiting value, the microcomputer 61 feeds to the power stage 58 a command signal for de-energising the coil 28 of the electromagnetic clutch 24 and leave the drive shaft 23 and rear axle wheels disengaged from the shaft 13 of the gearbox, so that the vehicle is subjected to two-wheel drive.

If however the vehicle speed is greater than the limiting value, the microcomputer 61 feeds to the power stage 58 a command signal for energising the coil 28 of the electromagnetic clutch 24, which attracts the disc 32, and by means of the engagement of the toothing 31 and 34 makes the shaft 13 also rigid with the drive shaft 23 and the rear axle wheels, so engaging the four-wheel drive.

Thus under normal conditions the vehicle starts with two-wheel drive on the front wheels, so preventing the transmission locking which would occur with wheels subjected to sharp turning on high adhesion ground.

However if with the brake pedal at rest, the accelerator pressed less than the respective limit and the speed also less than the respective limit the microcomputer 61 calculates that the acceleration of one or both of the wheels 62 and 63 is greater than the predetermined limiting value, it feeds to the power stage 58 a command signal for energising the coil 28 of the electromagnetic clutch 24, so engaging the toothing 31 and 34 of said clutch, so as to engage the four-wheel drive and prevent slipping of the wheels especially on low adhesion ground.

However if with the four-wheel drive engaged the microcomputer 61 receives a brake pedal operation signal from the line 80 and also verifies that the deceleration of the wheels 62 and 63 is greater than the predetermined limiting value, it feeds to the stage 58 a command signal for de-energising the coil 28 of the electromagnetic clutch, to disengage the four-wheel drive and thus run with two-wheel drive.

This thus prevents simultaneous locking of the four wheels of the vehicle in the case of too heavy braking on low adhesion ground.

What is claimed is:

1. A control apparatus particularly for a four-wheel drive vehicle in which one wheel group is always engaged, the output shaft of the change-speed gearbox being connected permanently to the differential of said one wheel group and being connected selectively to the differential of the other wheel group by separable connection means and actuator means, said control apparatus comprising means which sense the respective speed of the wheels of the always engaged group and are operationally connected to a control unit comprising comparator means arranged to compare the wheel speed signals with predetermined limiting values to establish whether they are greater or less than said limiting values and to provide signals indicative of the results of the comparison, said control unit being operationally connected to said actuator means, characterised by also comprising means for sensing the position of the brake pedal and means for sensing the commencement of travel of the accelerator pedal and also operationally connected to said control unit, said control unit comprising logical operation means in cooperation with said comparator means and responsive to said signals is able to feed to said actuator means first signals for causing said connection means to disconnect the differential of said other wheel group from the output shaft of the gearbox should the speed be less than the predetermined limit, and second signals for causing said connection means to connect said differential of said other wheel group with the output shaft of the gearbox should the speed exceed the predetermined limit, said control unit further comprising processor means arranged to obtain from the signals of said wheel speed sensors signals indicative of the speed variations and the direction of said variations in order to distinguish acceleration from deceleration, said comparator means being also able, in the presence of a signal indicating that the travel of the accelerator pedal has commenced, to compare the acceleration signals with a predetermined limiting value to establish whether these are greater or less than said limiting value, and to provide signals indicative of the results of the comparison, said logical operation means being also able to exclude said first signals and able to feed to said actuator means said second control signals for causing said connection means to make said differential rigid with the output shaft of the gearbox should the acceleration exceed the predetermined limit, said comparator means being further able, in the presence of a signal indicating operation of the brake pedal, to compare the deceleration signals with a predetermined limiting value to establish whether they are greater or less than said limiting value and to provide signals indicative of the results of the comparison, said logical operation means being able to exclude said second signals and being able to feed said first signals to said actuator means in order to cause said connection means to disconnect the differential of said other wheel group from the output shaft of the gearbox, even at a speed exceeding said limiting value, should the deceleration be greater than the respective limiting value.

2. A control apparatus as claimed in claim 1, characterised further comprising means for sensing the position of the clutch pedal and means for sensing the position of the gear control rod of the gearbox whereby signals are sent to said logical operation means indicating movement of the clutch pedal and the gear control rod, and selectively engage or disengage the differential of said other wheel group.

3. A control apparatus as claimed in claim 1, characterised in that said speed sensor means are able to provide pulse signals of frequency proportional to the speed of rotation of the wheels, and said processor means comprise phase locked loop (PLL) comparators able to provide signals proportional to the speed of the wheels and signals proportional to variations in the speed of said wheels.

4. A control apparatus as claimed in claim 1, characterised in that said connection means and the relative actuator means are constituted by an electromagnetic clutch with toothed coupling.

* * * * *